(12) United States Patent
McBeath

(10) Patent No.: US 7,085,238 B2
(45) Date of Patent: Aug. 1, 2006

(54) SMARTJACK FOR FAULT-TESTING NETWORK SEGMENTS ON ETHERNET AND OTHER INTERNET PROTOCOL NETWORK ARCHITECTURES

(75) Inventor: Tom McBeath, Simi Valley, CA (US)

(73) Assignee: Spirent Communications of Rockville, Inc., Rockville, MD (US)

( * ) Notice: Subject to any disclaimer, the term of this patent is extended or adjusted under 35 U.S.C. 154(b) by 315 days.

(21) Appl. No.: 10/735,129

(22) Filed: Dec. 11, 2003

(65) Prior Publication Data

US 2005/0144328 A1 Jun. 30, 2005

(51) Int. Cl.
*H04J 1/16* (2006.01)
(52) U.S. Cl. .................... 370/249; 709/251
(58) Field of Classification Search .............. None
See application file for complete search history.

(56) References Cited

U.S. PATENT DOCUMENTS

| | | | | |
|---|---|---|---|---|
| 5,173,896 A | * | 12/1992 | Dariano | 370/249 |
| 5,553,059 A | * | 9/1996 | Emerson et al. | 370/248 |
| 5,970,069 A | * | 10/1999 | Kumar et al. | 370/402 |
| 6,032,187 A | * | 2/2000 | Blain | 709/230 |
| 2003/0115368 A1 | | 6/2003 | Wu | |

* cited by examiner

*Primary Examiner*—Frank Duong
(74) *Attorney, Agent, or Firm*—Donald R. Boys; Central Coast Patent Agency, Inc

(57) ABSTRACT

A fault-testing node for a connectionless data link has at least two opposing communication ports; a soft switch for controlling port-to-port data flow through the device; and an instance of software for modifying packet header information. The node enables loop-back testing by one or more port-to-port data flow paths being switched through activation of the soft switch to loop incoming packets back to the sender of the packets through the device and wherein the instance of software reverses the order of source and destination addresses of data units to insure acceptance of looped data units at the sender station.

20 Claims, 4 Drawing Sheets

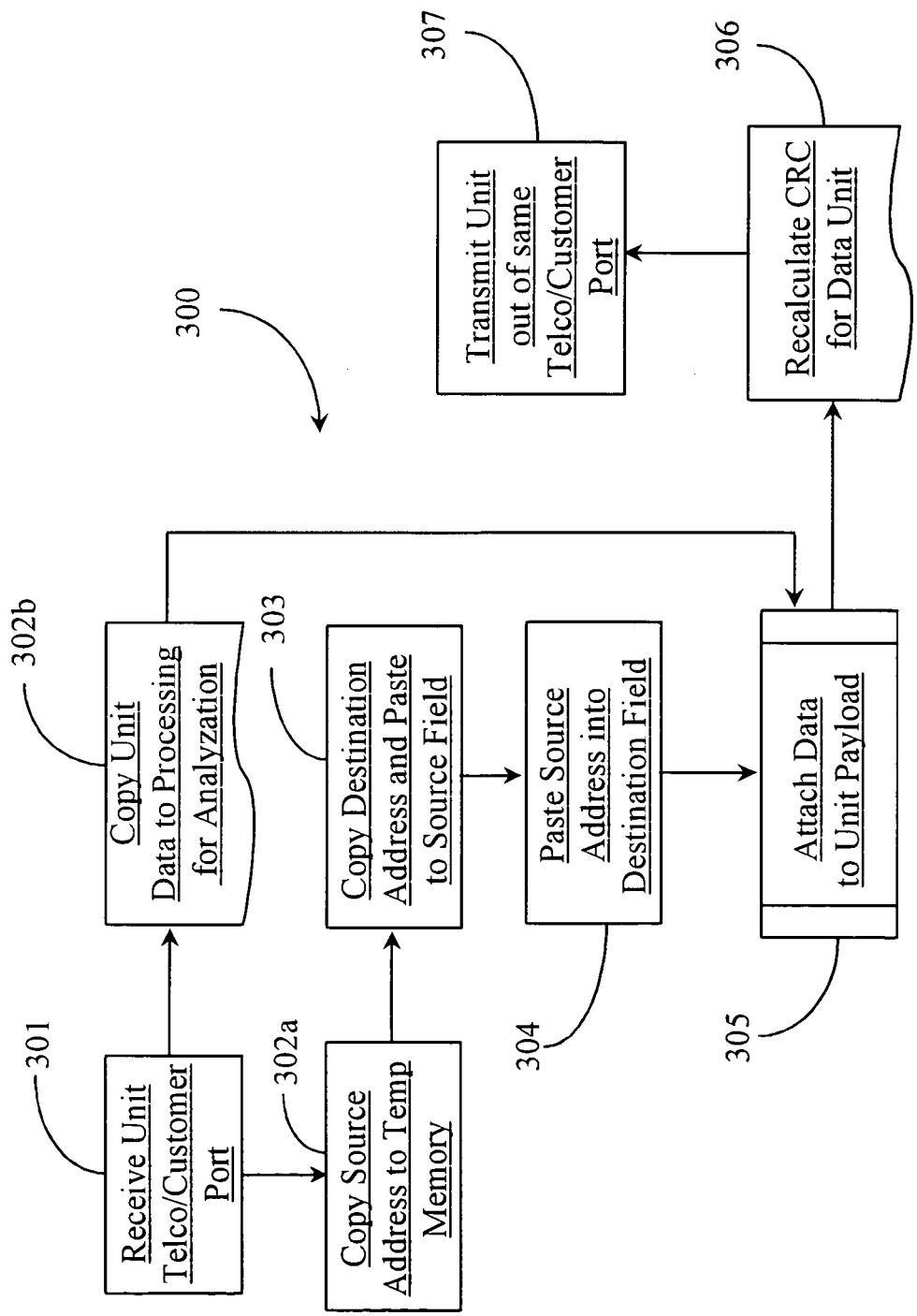
*Fig. 3 (Loop Back Mode)*

SMARTJACK FOR FAULT-TESTING NETWORK SEGMENTS ON ETHERNET AND OTHER INTERNET PROTOCOL NETWORK ARCHITECTURES

FIELD OF THE INVENTION

The present in invention is in the field of data packet communication over a data packet network and pertains more particularly to a computerized device functioning as a controlled demarcation point for data packets in a data packet network used for fault testing and other network testing.

BACKGROUND OF THE INVENTION

A conventional Digital Subscriber Line (DSL) leased from a telecommunications company uses a Time Division Multiplex (CDM) carrier or circuit, over which connection-oriented digital communication is practiced The span of cable or line extending between the telecommunications provider and the Customer Premise Equipment (CPE) is sometimes referred to in the art as a local loop. The first precursor to DSL technology was Integrated Services Digital Network (ISDN), which unlike pure DSL, transmits data as analog data over a telephone line but uses analog-to-digital (A/D) conversion for receive at the user end and digital-to-analog (D/A) conversion for send at the user end with an ISDN modem. Pure DSL does not require any data transformation between analog and digital. All transmissions over the phone line are digital and DSL cable modems are used.

Multiple DSL users are typically connected to a Digital Subscriber Line Access Multiplexer (DSLAM), which is in turn connected to a high-speed network backbone, typically an Asynchronous Transfer Mode (ATM) backbone. A DSLAM also de-multiplexes data traveling from the backbone to other geographically disparate destination loops or circuits. Other typical and emerging DSL technologies include Asymmetric Digital Subscriber Line (ADSL), Symmetric Digital Subscriber Line (SDSL), Very high-speed Digital Subscriber Line (VDSL), and High-bit rate Digital Subscriber Line (HDSL). Most typical home users are familiar with ADSL.

In a TDM connection-oriented network, fault testing a DSL segment or line is typically enabled by a mechanism known in the art as a smartjack. A smartjack is typically implemented in known art, for example, over an HDSL line using T1/DS1 protocols. T1/DS1 is a digital subscriber (DS) level and data framing specification for synchronous digital streams at a T1 transmission rate of 1,544,000 bits per second.

A smartjack is an input/output (I/O) device running logic, such as software, that is installed between the telecommunications switch (Telco) and a CPE switch or router in a local loop on the customer end. A typical smartjack is a box that has a Telco-side RX/TX port and a customer or CPE-side RX/TX port.

A smartjack is activated remotely by an administrator when link testing is to be performed. When in test mode the smartjack is caused to physically loop every bit received on the RX link of a port to the corresponding TX link of the same port. The data frames sent to the box are received back over the same line without any modifying of the structure. The loop-back testing technique is a standard and is well known in the art as a method of determining whether a detected network fault is somewhere in the transmission network or on the customer site of a connection-oriented link When the device is not in test mode, it remains in a transparent pass through mode where every bit received (RX) on one port is sent on through to the transmit line (TX) on the opposite port the box transmitting data as such bi-directionally.

While a smartjack of prior-art enables fault testing and isolation on a TDM connection-oriented data link, it cannot be used with newer packet-switched or connectionless network lines, for example those using Transfer Control Protocol/Internet Protocol (TCP/IP) including Ethernet network technologies. For example, if a data packet were transmitted to a prior-art smartjack installed in a connectionless link, and it were to be returned to the source station unchanged from the same port it would be rejected by the sending station as not being addressed to the sending station. This is because data packet headers (IP or Ethernet) must be addressed for source (sender) and destination (receiver) according to request/response protocols.

If the destination address header field of a data packet for send is set to the address of the sending station while at the sending station then the packet could not be sent. In other words, data loops are not permissible in a connectionless architecture. Attempting a software workaround to this problem is also not productive, because if the packet could be transmitted from the sending station having the destination address of the sending station then the software at the CPE switch or router could not properly forward the packet.

Therefore, what is clearly needed is a fault-testing device somewhat similar to a smartjack that can provide the same fault testing services using a point-to-point tunneling protocol for a packet-switched network line.

SUMMARY OF THE INVENTION

In an embodiment of the present invention a fault-testing node for a connectionless data link is provided, comprising at least two opposing communication ports, a soft switch for controlling port-to-port data flow through the device, and an instance of software for modifying header information associated with data units, wherein one or more port-to-port data flow paths are switched by activating the soft switch to loop incoming data units back to the sender of the data units through the device, and wherein the instance of software reverses the order of source and destination addresses of data units to insure acceptance of looped data units at the sender station.

In one embodiment the connectionless data link is an Ethernet data link, the data units are Ethernet frames, and the source and destination addresses are MAC addresses. In another embodiment connectionless data link is an IP data link, the data units are IP data packets, and the source and destination addresses are IP addresses. In some embodiments the instance of software modifies the data unit header fields by copying the data from the first field to memory, copying the data from the second field and pasting the data into the first field, and then pasting the data from the memory into the second field.

In some embodiments there are two operating modes, a loop-back mode and a pass-through mode. There may further be an array of resident fault testing applications and a logging component to create activity and error logs during testing and during normal operation.

Also in an embodiment loop-back tests performed include one or a combination of tests returning data for number of bytes sent or received over the link for a specified period, number of packets sent or received over the link for a specified period; number of CRC errors occurring over a specified period, average packet length of packets sent or received over the link during a specified period, average transmission rate over the link address identification of the link and protocol types in operation over the link.

In some embodiments intrusive tests are performed including Bit-Error-Rate-Testing, testing for throughput between the node and another on-line device, testing for packet delay between any two points on the link, testing for jitter between any two point on the link, and testing for packet loss between any two points on the link.

In another aspect of the invention, in a fault-testing node for a connectionless data link, the node having at least two opposing communication ports and an instance of software for modifying data unit header information, a method is provided for switching data sets resident in address fields of a data unit, enabling loop-back of data units received at the node to the sender of the data units. The method comprises steps of (a) copying the data set from a first field to a memory; (b) copying the data set from a second field; (c) pasting the data set from the second field into the first field; and (d) pasting the data set copied to memory in step (a) into the second field.

In some embodiments of the method in step (a) the first field is a source address field the data set a source IP address of an IP data packet. Also in some embodiments in steps (b) and (c) the second field is a destination address field the data set a destination IP address, which becomes a source IP address when pasted into the source field of the IP data packet.

In some embodiments in step (d) the data set is a source address, which becomes a destination IP address when pasted into the destination field of the IP data packet. Also in some embodiments in step (a) the first field is a destination address field the data set a destination IP address of an IP data packet. In some other embodiments in steps (b) and (c) the second field is a source address field the data set a source IP address, which becomes a destination IP address when pasted into the destination field of the IP data packet.

In still other embodiments of the method in step (d) the data set is a destination IP address, which becomes a source IP address when pasted into the source field of the IP data packet. Also in other embodiments in step (a) the first field is a source address field the data set a source machine access code address of an Ethernet data frame. In still other embodiments in steps (b) and (c) the second field is a destination address field the data set a destination machine access code address, which becomes a source machine access code address when pasted into the source field of the Ethernet data frame.

In yet other embodiments of the invention in step (d) the data set is a source address, which becomes a destination machine access code address when pasted into the destination field of the Ethernet data frame. Also in other embodiments in step (a) the first field may be a destination address field the data set a destination machine access code address of an Ethernet data frame. Also in embodiments in steps (b) and (c) the second field may be a source address field the data set a source machine access code address, which becomes a destination machine access code address when pasted into the destination field of the Ethernet data frame. In still other embodiments in step (d) the data set is a destination machine access code address, which becomes a source machine access code address when pasted into the source field of the Ethernet data frame.

BRIEF DESCRIPTION OF THE DRAWING FIGURES

FIG. 3 is a process flow diagram illustrating basic steps for data flow through the smartjack of FIG. 1 during a loop-back mode according to an embodiment of the present invention.

DESCRIPTION OF THE PREFERRED EMBODIMENTS

The inventor provides a packet demarcation device (an enhanced smartjack) that is supported in a connectionless TCP/IP network including an Ethernet network, and may also be useful in other connectionless networks. The methods and apparatus of the invention are described in enabling detail below with reference to embodiments of the invention.

Figure 1:
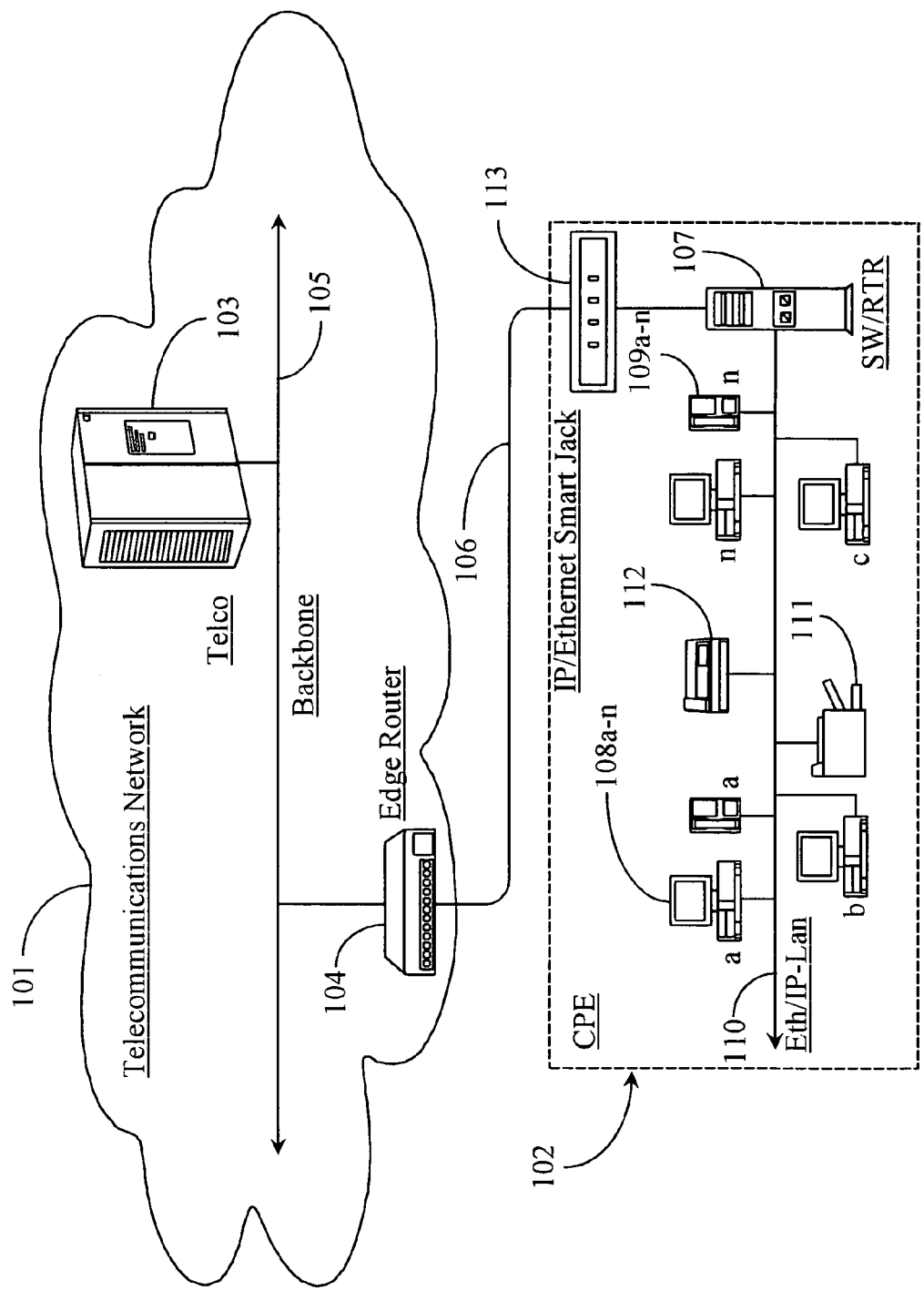
FIG. 1 is an overview of a telecommunications network using an IP/Ethernet smartjack according to an embodiment of the present invention.

FIG. 1 is an overview of a telecommunications network 101 hosting an IP/Ethernet smartjack 113 according to an embodiment of the present invention, and a customer premise 102. CPE site 102 can be an enterprise hosting an Ethernet Local Area Network (LAN) or Wide-Area-Network (WAN), or a network adapted according to standard Transfer Control Protocol/Internet Protocol (TCP/IP) and other Internet protocols.

CPE 102 in this example has an Ethernet or IP-enabled LAN 110 that is used to interconnect equipment responsible for company network communication. LAN 110 in this example has a plurality of computer workstations 108a–n connected thereto for communication and resource sharing. Workstations 108a–n represent typical agent workstations of an enterprise. Telephones 109a–n are illustrated within CPE 102 and are logically illustrated as connected to LAN 110. It may be assumed that there exists one telephone 109a–n for each workstation 108a–n). The inventor illustrates only two such telephones and deems the illustration sufficient for the purpose of explaining the present invention. Of the exemplary equipment types illustrated in this example as connected to LAN 110 are a shared printer 111, and a shared facsimile machine 112.

Network 110 is in one example an Ethernet network, but also may be an IP protocol network, although there are some overlapping features. A CPE switch/router (SW/RTR) 107 is provided in this example within CPE 102 and is adapted to perform bi-directional routing of interactions incoming to and outgoing from network 101. For example, all data incoming to RTR 107 is forwarded along over network 110 to appropriate stations 108a–n. RTR 107 represents the last hop in the network before LAN 110. Similarly it is the first hop for outgoing messages sourced from any machine connected to LAN 110.

IF LAN 110 is an Ethernet network then the Ethernet protocols (Faring Technology), Machine Access Codes (MAC addresses), an applicable Ethernet hub, and Ethernet network cards with an Ethernet driver are typically used according to standard Ethernet network set-up and protocols. If LAN 110 is not Ethernet, but an IP-enabled LAN (Packet Based), then all of the normal and standard IP conventions are observed. One difference in function between Ethernet and non-Ethernet packet switched networks relates to the present invention in how data is packaged. Ethernet uses a packet framing technology (packet frames) that employs machine code addresses (MAC) in a request/response format, for example, a source MAC address and a destination MAC address. IP uses a data packet format utilizing a source IP address and a destination IP address for request/response communication.

Telecommunications network 101 encompasses in this example a telecommunications host or carrier (Telco) switch 103 connected to a network backbone 105. Telco 103 represents a local switch site facility, which may include other standard equipment (not shown). Backbone 105 can be an ATM backbone without departing from the spirit and scope of the present invention. Likewise, other equipment types and carrier lines may be assumed present in network domain 101.

A service provider that provides telecommunications services carried digitally over connection-oriented serves as a host in this example for Telco switch or facility 103 and, in this case as well, connectionless leased lines or trunks to end users or subscribers. An edge router 104 is illustrated within the domain of network 101 and marks the edge of the network where data departing enters a disparate network or loop and data arrives from a disparate network or loop. Router 104 is typically the last routing point for data destined for CPE 102.

IP/Ethernet Smartjack 113 in this example is a packet demarcation point between Telco equipment and lines, and CPE equipment and lines. Smartjack 113 in this example is owned and provided by Telco 103 as a local service provider. Smartjack 113 provides a network fault-testing facility that is capable of loop-back packet transmission utilizing either the network or customer-side port. Smartjack 113 in one embodiment uses a novel packet loop-back technique enabled by logic, typically software, (not illustrated) running on the device. An administrator on the Telco side of smartjack 113 can carry out a series of automated and intrusive tests by calling smartjack 113 and instructing it to initiate and perform testing by sending instruction data to it in a data packet or frame (Ethernet). The administrator can check the line between backbone 105 and jack 113. Likewise an administrator on the side of CPE 102 operating from LAN 110, for example, can test network function and performance on the customer-side.

As was described above in the background section, newer packet-based networks including Ethernet and IP networks, package data in data packets (IP) or Ethernet frames (Ethernet) wherein source and destination addresses are used in a sequence-based request/response format. Therefore, the smartjack of prior-art will not work in this embodiment because it must physically loop (hard switch) all data received at a port on a receive wire back out the same port on a corresponding transmit wire with the data absolutely unchanged.

Smartjack 113, unlike devices of prior ark is enhanced with logic, typically software, but may be firmware, hardware, or a combination, that is adapted to swap source and destination addresses in packet header address fields enabling a received packet to arrive at a port and depart out of the same port back to the sender whether the sender is on the Telco side or the customer side. The ability to perform IP and Ethernet loop-back testing is described in more detail below in this specification.

Figure 2A:
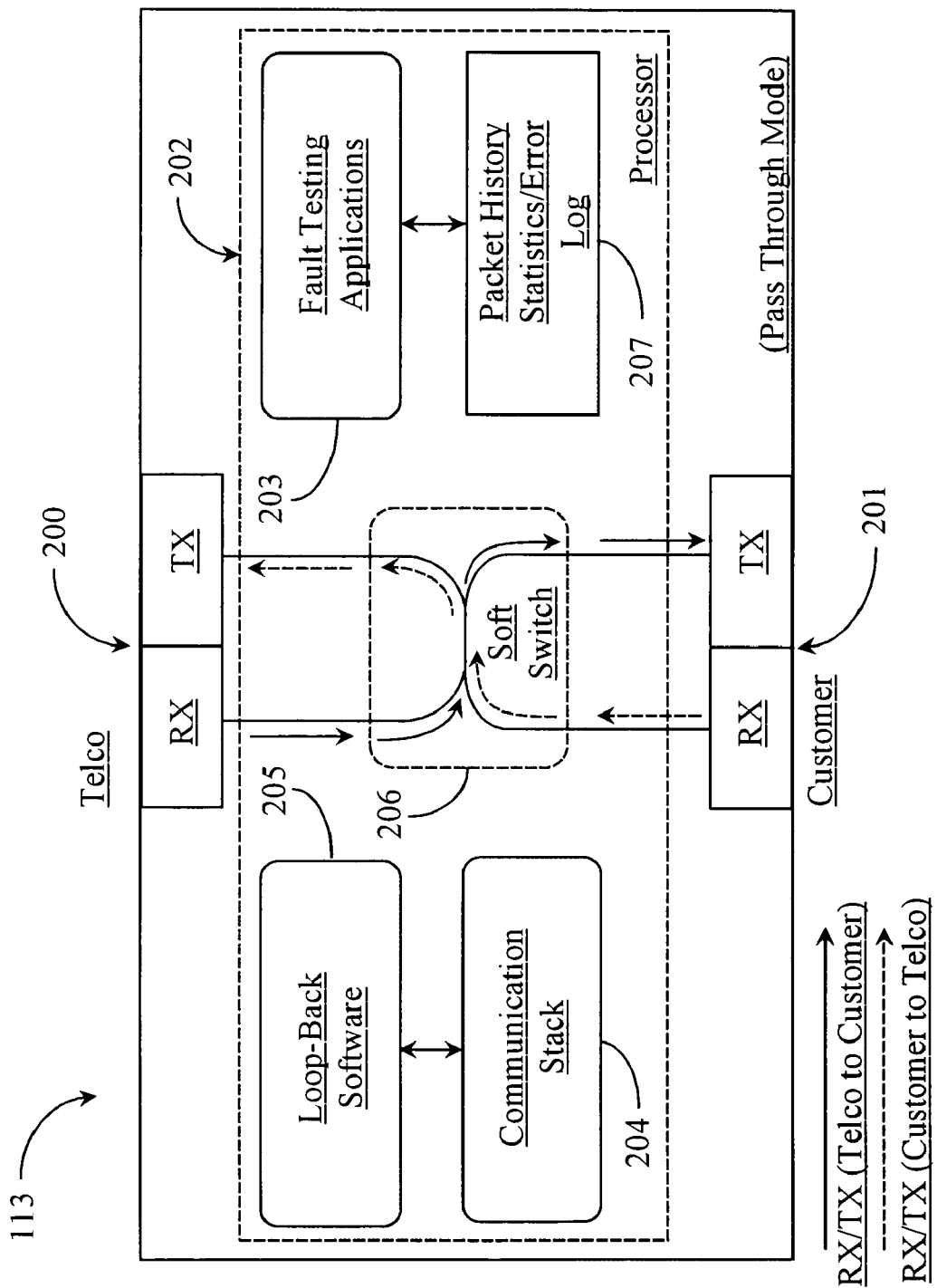
FIG. 2A is a block diagram illustrating components of the smartjack of FIG. 1 operating in a pass-through mode.

FIG. 2A is a block diagram illustrating an embodiment with components of smartjack 113 of FIG. 1 operating in a transparent pass-through mode. Smartjack 113 in this example has at least two communication ports labeled herein as a Telco port 200, and a Customer port 201. Each port 200 and 201 is enabled to RX (receive) packets and to TX (transmit) packets.

Smartjack 113 in this example has a processor 202 adapted with logic for performing basic functions including memory caching and data unit processing. Processor 202 in this example has an array of fault testing logic applications 203 that can be remotely initiated and programmed to perform certain tests. Processor 202 has an archiving or logging software 207 associated with applications 203 adapted to record all data activity and results during testing and normal runtime including compiling and maintaining data history, statistics, and error logs as might be related to any one or a combination of test procedures or normal data flow-through.

A communication stack 204 is provided in this embodiment on processor 202 and adapted for data unit generation and send for any units originating from smartjack 113 containing test results, history data, error logs, and so on. If smartjack 113 is adapted for TCP/IP, then the data units are data packets. If the smartjack is adapted for Ethernet then the data units are Ethernet data frames. Smartjack 113 in this embodiment is a communication node and is capable of alerting remote nodes of status, and is also capable of requesting communication with remote nodes using TCP/IP or Ethernet protocols. If smartjack 113 were adapted as an Ethernet smartjack then it would have a network card (not illustrated), a MAC address burned thereon and be powered by the Ethernet network driver.

At the heart of smartjack 113 in this embodiment is a soft switch, which can be remotely commanded and controls port-to-port packet flow through the device. When smartjack 113 is not in loop-back mode in this embodiment, it is in a pass-through mode transparent to the customer. In pass-through mode for example, all data units received at Telco port 200 that are destined for a CPE-based entity (referring to FIG. 1, LAN 110, machines 108a–n) may be forwarded to TX on customer port 201 representing normal data flow in one direction (solid directional arrows). Likewise, all data units received at customer port 201 destined for entities outside of CPE domain 102 may be forwarded to TX on Telco port 200 (dotted directional arrows). In this mode jack 113 is completely transparent.

In pass-through mode all data is copied to processing unit 202 for analysis. Analysis of all data moving through smartjack 113 provides required information about data unit activity, error states, and other statistics about network performance. Smartjack 113 in this embodiment has a logic instance 205 labeled herein Loop-Back Software. Logic 205 provides a capability for swapping source and destination addresses for data units that are to be looped back to a sender. More detail about how data loop-back is accomplished is provided below.

Figure 2B:
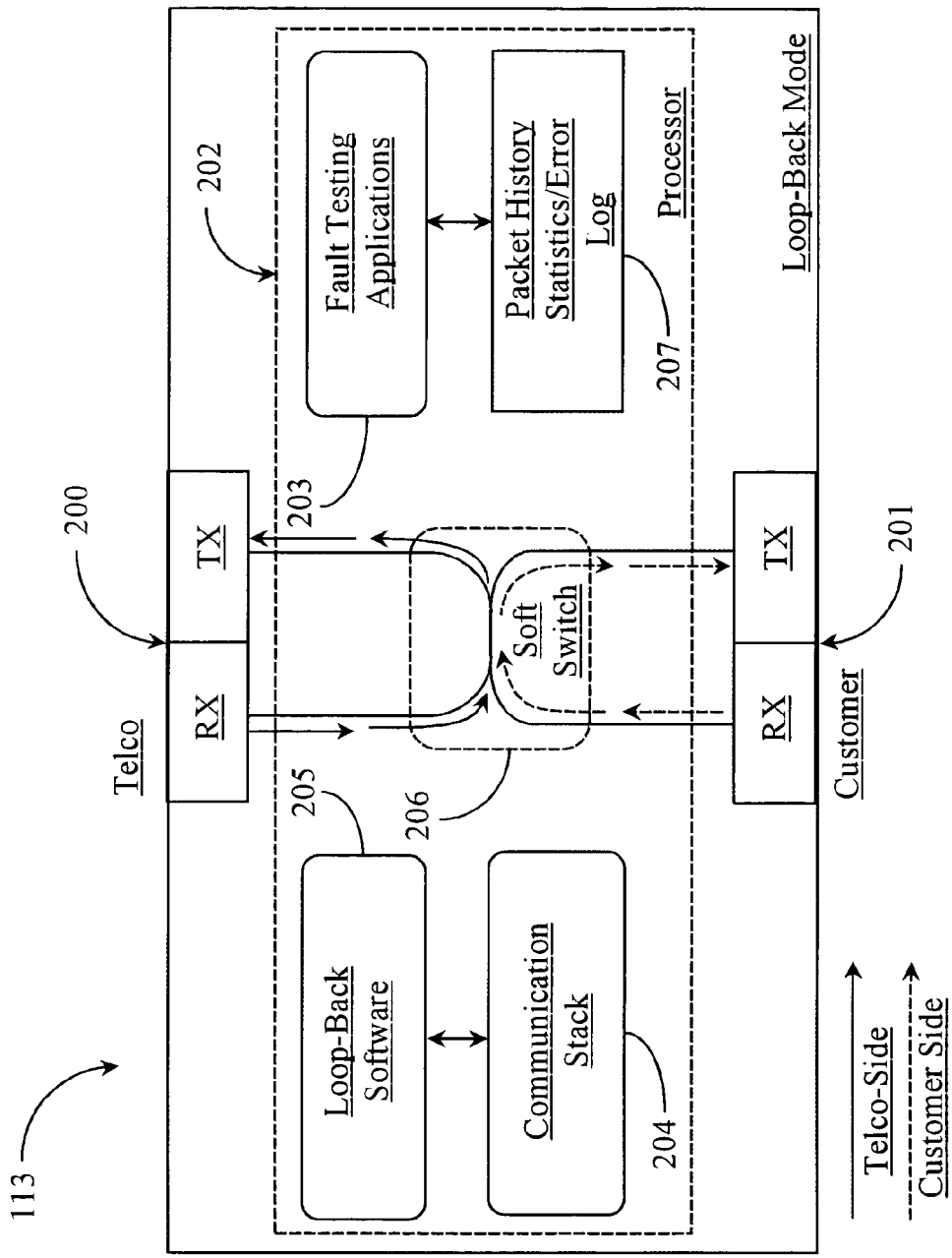
FIG. 2B is a block diagram illustrating components of the smartjack of FIG. 1 operating in a loopback mode.

FIG. 2B is a block diagram illustrating components of smartjack 113 of FIG. 1 operating in a loop-back mode according to an embodiment of the present invention. All of the elements described in the example of FIG. 2A above are present also in this example. Therefore, the elements common to both examples retain the same element numbers as in FIG. 1 and are not reintroduced.

In this example smartjack 113 is in loop-back mode. Loop-back mode is a mode that may be configured on the fly or on a schedule for the purpose of looping back all data received by smartjack 113 back to the sender out of the same port for testing purposes. A network administrator or other authorized agent operating a network-connected node may enable loop-back mode by sending a data unit (packet or frame) containing the instruction set for configuring smartjack 113 to begin looping back data. For example, a network administrator or some authorized agent on the Telco side of smartjack 113 might initiate a data unit that contains instructions for initiating loop-back mode. After receiving the data unit, soft switch 206 is automatically configured to begin looping back data.

After smartjack 113 is configured for loop back mode, all data received at Telco port 200 (RX) will be retransmitted back to the sender through TX on the same port. Likewise all data received (RX) at customer port 201 will be retransmitted back to the sender through TX of port 201. In this regard, both sides of the line, the network side and the customer side can be fault tested sequentially or simultaneously.

It is noted herein that all data is copied and analyzed by processor 202 at the same time as fault testing so activity logging is not interrupted. Loop-back logic 205 functions in this embodiment to work with the header address fields of each received data unit during loop-back mode so that the source and destination addresses are reversed (swapped) such that the sender address becomes the destination address for transmission out of the same port. Normal header address fields in this example are placed at fixed offsets from the start of the data unit whether the unit is a data packet (IP) or a data frame (Ethernet). Software 205 copies the first address into temporary memory (not illustrated) provided on processor 202. The second address is then copied and pasted over the first address. The address in temporary memory is then copied over the second address. The data unit must be recalculated for Cyclic Redundancy using a Cyclic Redundancy Check (CRC) scheme, which may vary from scheme to scheme according to prevailing protocol.

A significant advantage of smartjack 113 in the loop-back mode is that faults can be quickly detected and isolated as either existing at some point on the Telco side of the connection or on some point on the CPE side of the connection. It is noted herein that most fault testing over a connectionless network line using smartjack 113 is performed in layer 2 of the OSI model using a tunneling protocol. If smartjack 113 is placed on an Ethernet network then source and destination MAC addresses are swapped by software 205. In an IP network connection, IP source and destination addresses are swapped. The typical communication stack 204 does not have to be modified in order to practice the present invention. Logic 205 sits on top of communication stack 204.

Loop-back testing can return information about the link being tested, such as the number of bytes sent or received on the line over a specified testing period; the number of data units sent or received over the line; the number of CRC errors occurring over a specified period; average length of data units sent or received; average transmission rate of the line; address information seen on the link; current protocol types being utilized over the link; and for Ethernet, the number of runt data frames occurring over an Ethernet link Runt data frames are illegally small frames usually caused by frame collision on a half-duplex Ethernet link.

It is also noted herein that smartjack 113 in certain embodiments can be configured on the fly to initiate and perform a number of different intrusive tests at varying protocol levels. For example, smanijack 113 may be configured to run a Bit-Error-Rate-Test (BERT) using Psuedo-Random-Bit-Sequence (PRBS) patterns or any user-defined patterns. A BERT test is typically used to test the ratio of erroneous bits received on the link for example to the number of received bits total. In addition, throughput between smartjack 113 and any other on-line device may be determined as well as delay, jitter, and packet/frame loss between any two points on the network. It is also noted herein that the above-described tests may be ordered and performed according to various combinations and sequences including multiple instantiations of the same test.

FIG. 3 is a process flow diagram illustrating basic steps for data flow through the smartjack of FIG. 1 during a loop-back mode according to an embodiment of the present invention. Assuming that smartjack 113 is configured and ready for loop-back testing, at step 301 a data unit, which may be an IP packet or Ethernet frame, is received at either the Telco, or customer side port depending on the location of the test administrator. At step 302a, the loop-back software copies the first address found in the unit header to temporary memory. Simultaneously, at step 302b data of the received data unit is copied for the purpose of processing and analyzing.

At step 303 the loop-back software copies the second found address from the unit header and pastes it into the first address field at the appropriate offset position. At step 304 the loop-back software pastes the first address into the second address field. Now the data unit is address-ready for retransmission out of the same port it was received.

At step 305, the processing component attaches any appropriate data to the data unit payload such as return of test results, time stamps, and so on. Because the data unit was altered, at step 306 a CRC is performed on the unit. At step 307 the data unit is transmitted out of the same Telco or customer port that it was received on with the destination address being that of the original sender.

It will be apparent to one with skill in the art that the methods and apparatus of the present invention can be applied to Ethernet links or IP links over a WAN or LAN architecture without departing from the spirit and scope of the present invention. Using the address-swapping technique enables fault identification and geographic isolation on both sides of a leased line, for example on the Telco side and on the customer side.

The methods and apparatus of the invention should be afforded the broadest possible scope under examination. The methods and apparatus of the present invention are limited only by the claims that follow.

What is claimed is:

1. A fault-testing node for a connectionless data link comprising:
   at least two opposing communication ports;
   a soft switch for controlling port-to-port data flow through the device; and
   an instance of software modifying header information associated with data units by copying the data from the first field to memory, copying the data from the second field and pasting the data into the first field, and then pasting the data from the memory into the second field;
   wherein one or more port-to-port data flow paths are switched by activating the soft switch to loop incoming data units back to the sender of the data units through the device, and wherein the instance of software reverses the order of source and destination addresses of data units to insure acceptance of looped data units at the sender station.

2. The node of claim 1 wherein the connectionless data link is an Ethernet data link, the data units are Ethernet frames, and the source and destination addresses are MAC addresses.

3. The node of claim 1 wherein the connectionless data link is an IP data link, the data units are IP data packets, and the source and destination addresses are IP addresses.

4. The node of claim 1 having two operating modes, a loop-back mode and a pass-through mode.

5. The node of claim 1 further comprising an array of resident fault testing applications and a logging component to create activity and error logs during testing and during normal operation.

6. The node of claim 1 wherein loop-back tests performed include one or a combination of tests returning data for number of bytes sent or received over the link for a specified period, number of packets sent or received over the link for a specified period; number of CRC errors occurring over a specified period, average packet length of packets sent or received over the link during a specified period, average transmission rate over the link, address identification of the link, and protocol types in operation over the link.

7. The node of claim 1 wherein intrusive tests are performed including Bit-Error-Rate-Testing, testing for throughput between the node and another on-line device, testing for packet delay between any two points on the link, testing for jitter between any two point on the link, and testing for packet loss between any two points on the link.

8. In a fault-testing node for a connectionless data link, the node having at least two opposing communication ports and an instance of software for modifying data unit header information, a method for switching data sets resident in address fields of a data unit enabling loop-back of data units received at the node to the sender of the data units comprising steps of:
   (a) copying the data set from a first field to a memory;
   (b) copying the data set from a second field;
   (c) pasting the data set from the second field into the first field; and
   (d) pasting the data set copied to memory in step (a) into the second field.

9. The method of claim 8 wherein in step (a) the first field is a source address field the data set a source IP address of an IP data packet.

10. The method of claim 9 wherein in steps (b) and (c) the second field is a destination address field the data set a destination IP address, which becomes a source IP address when pasted into the source field of the IP data packet.

11. The method of claim 10 wherein in step (d) the data set is a source address, which becomes a destination IP address when pasted into the destination field of the IP data packet.

12. The method of claim 8 wherein in step (a) the first field is a destination address field the data set a destination IP address of an IP data packet.

13. The method of claim 12 wherein in steps (b) and (c) the second field is a source address field the data set a source IP address, which becomes a destination IP address when pasted into the destination field of the IP data packet.

14. The method of claim 13 wherein in step (d) the data set is a destination IP address, which becomes a source IP address when pasted into the source field of the IP data packet.

15. The method of claim 8 wherein in step (a) the first field is a source address field the data set a source machine access code address of an Ethernet data frame.

16. The method of claim 15 wherein in steps (b) and (c) the second field is a destination address field the data set a destination machine access code address, which becomes a source machine access code address when pasted into the source field of the Ethernet data frame.

17. The method of claim 16 wherein in step (d) the data set is a source address, which becomes a destination machine access code address when pasted into the destination field of the Ethernet data frame.

18. The method of claim 8 wherein in step (a) the first field is a destination address field the data set a destination machine access code address of an Ethernet data frame.

19. The method of claim 18 wherein in steps (b) and (c) the second field is a source address field the data set a source machine access code address, which becomes a destination machine access code address when pasted into the destination field of the Ethernet data frame.

20. The method of claim 19 wherein in step (d) the data set is a destination machine access code address, which becomes a source machine access code address when pasted into the source field of the Ethernet data frame.

* * * * *